United States Patent [19]

Murray

[11] Patent Number: 4,658,675
[45] Date of Patent: Apr. 21, 1987

[54] EPICYCLIC TRANSMISSION UTILIZING SETS OF RACES HAVING DIFFERENTIAL CLEARANCES

[75] Inventor: Richard E. Murray, Boulder, Colo.

[73] Assignee: Advanced Energy Concepts '81 Ltd., Boulder, Colo.

[21] Appl. No.: 578,930

[22] Filed: Feb. 10, 1984

[51] Int. Cl.⁴ .............................................. F16H 1/32
[52] U.S. Cl. ....................................... 74/805; 74/797
[58] Field of Search ................. 74/804, 805, 801, 797, 74/63, 202, 465; 384/584, 585

[56] References Cited

U.S. PATENT DOCUMENTS 4,271,726 6/1981 Ryffel ..................................... 74/805

FOREIGN PATENT DOCUMENTS 20314 12/1980 European Pat. Off. .............. 74/804
87742 9/1983 European Pat. Off. .............. 74/804

Primary Examiner—Leslie A. Braun
Assistant Examiner—Dwight G. Diehl
Attorney, Agent, or Firm—Sughrue, Mion, Zinn, Macpeak, and Seas

[57] ABSTRACT

An epicyclic speed reducing transmission including first and second sets of conjugate races and first and second sets of rollers disposed between races of the first and second sets utilizes rollers and races which are sized such that a first radial clearance between the rollers and the races which include a stator race exceeds the radial clearance between the second set of rollers and races which includes an output race so that the radial load handled by the first and second sets of rollers is equalized when the rollers are loaded by an eccentric cam utilized for orbiting one of the races of each set of conjugate races.

6 Claims, 2 Drawing Figures

EPICYCLIC TRANSMISSION UTILIZING SETS OF RACES HAVING DIFFERENTIAL CLEARANCES

CROSS REFERENCE TO RELATED APPLICATIONS

The present application is related to commonly assigned copending application Ser. Nos. 313,442 (filed Oct. 20, 1981) and 362,195 (filed Mar. 26, 1982, now U.S. Pat. No. 4,584,904), the disclosures of which are incorporated herein by reference.

BACKGROUND OF THE INVENTION

The present invention relates to an epicyclic speed reducing transmission having a first set of conjugate epitrochoidal-like and hypotrochoidal-like shaped races and a first set of rollers disposed in these races for transmitting torque therebetween to achieve a first speed reduction, as well as a second conjugate set of epi- and hypo-trochoidal-like shaped races and a second set of rollers disposed in these latter races for transmitting torque therebetween to achieve a second speed reduction. One of the races of the first set is restricted from rotating, thus forming a stator race.

Such a transmission utilizes an eccentric cam fixedly connected to an input which orbits one of the races of each of the sets of conjugate races as the input is rotated. The eccentric cam is sized so as to normally impose a load on the first and second sets of rollers, and, specifically, on those rollers on either side of a top dead center position of the cam. As the eccentric cam orbits the races, the race of the first conjugate set of races which is not maintained rotationally stationary is rotated due to torque transmitted by the first set of rollers so as to achieve the first speed reduction. One of the races of the second set of races is coupled to the rotating race of the first set of races and rotates therewith, and the other race of the second set of races is caused to rotate at a second speed reduction due to the torque transmitted between the races of the second set by the second set of rollers. If the conjugate trochoidal races, their corresponding set of rollers, and the input shaft eccentric were made to their theoretical dimensions, no clearance would exist between these elements when assembled. If the set of rollers or the conjugate trochoidal race profiles are formed so as to deviate from their theoretical size in the direction of increasing radial clearance, the internal epitrochoidal-like race could move in the radial direction with respect to a fixed hypotrochoidal-like race because of that clearance. The radial clearance is the total distance that the epitrochoidal-like race can be displaced in a radial direction for a conjugate set consisting of an epitrochoidal-like race, a hypotrochoidal-like race, and rollers.

In such a transmission, it has been conventional to maintain the first radial clearance (between the first set of rollers and the first conjugate set of races) equal to the second radial clearance (between the second set of rollers and the second set of races). Such transmissions oftentimes do not run as smoothly as desired.

SUMMARY OF THE INVENTION

Accordingly, an object of the present invention is to provide an epicyclic speed reducing transmission which operates more smoothly and more efficiently than prior art epicyclic speed reducing transmissions.

This and other objects are achieved by an epicyclic speed reducing transmission having first and second sets of conjugate trochoidal-like shaped races with first and second sets of rollers entrained between the races of the first and second sets of races, respectively, with the rollers and the races of the first set which includes a stator race being sized so as provide a larger radial clearance therebetween as compared to the radial clearance between the rollers and the races of the second set, with the output race being included in the second set of races.

DESCRIPTION OF THE PREFERRED EMBODIMENTS

Figure 1:
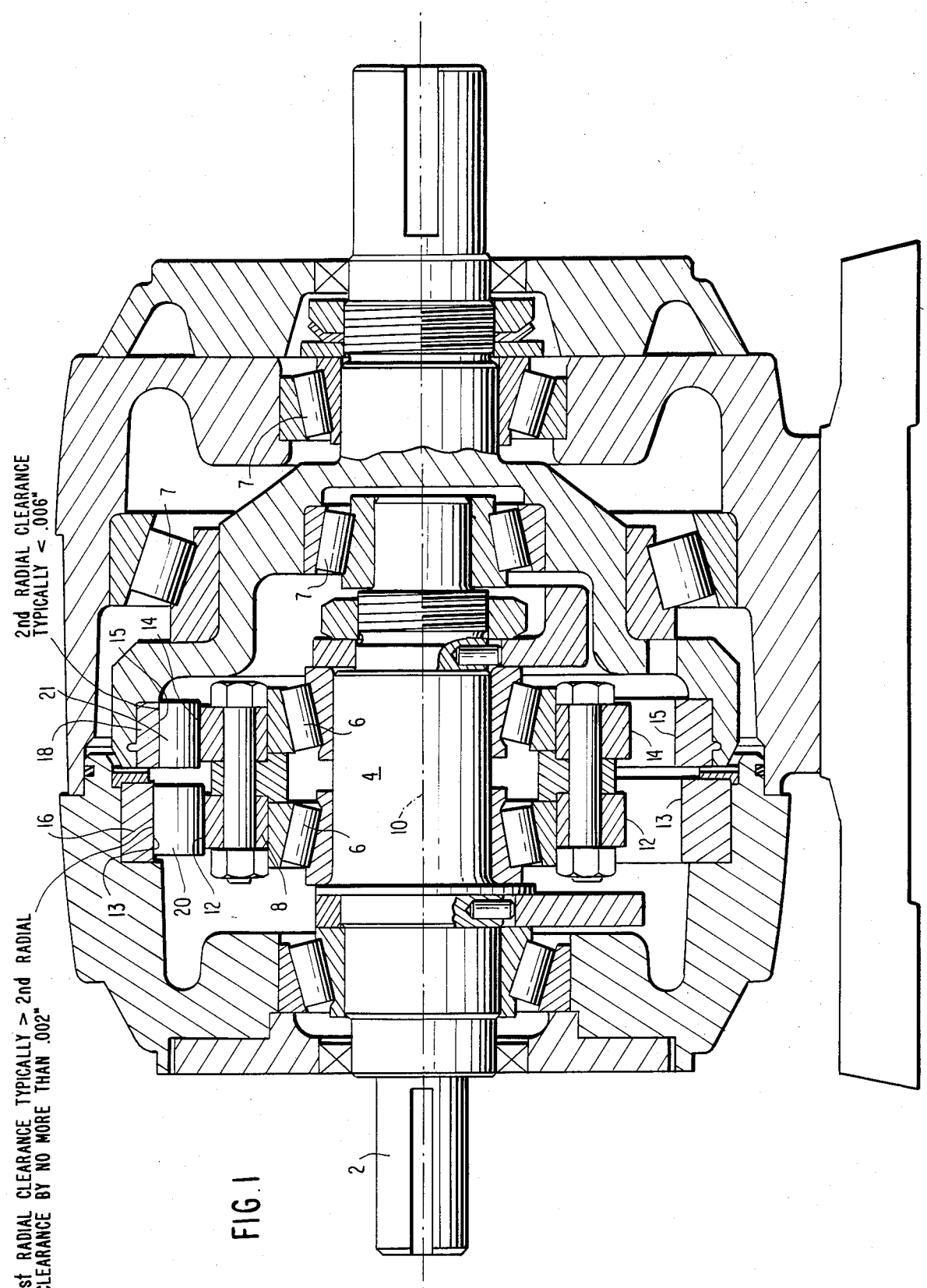
FIG. 1 illustrates an epicyclic speed reducing transmission constructed according to the present invention wherein the radial clearance provided between a first set of rollers and races is larger than the radial clearance provided between a second set of rollers and races.

Referring to FIG. 1, an epicyclic speed reducing transmission constructed according to the teachings of the present invention comprises an input shaft 2 having an eccentric cam 4 fixed thereto which operates via a set of tapered roller bearings 6 to orbit an idler 8 about a center axis 10 of the transmission. The idler 8 has epitrochoidal-like shaped races 12, 14 formed on outer radial surfaces thereof which confront respective conjugate hypotrochoidal-like shaped races 13, 15 formed on a stator ring member 16 and an output ring member 18, respectively, thus forming first and second sets of conjugate trochoidal-like shaped races 12, 13 and 14, 15.

The specific shape of the races 12-15 as well as methods for making the same are described in above-mentioned U.S. applications Ser. Nos. 313,442 and 362,195, and accordingly a description thereof will not be repeated herein. It should be noted, however, that the epitrochoidal-like shaped races 12, 14 can be formed on the stator 16 and/or the output 18 with the corresponding hypotrochoidal-like shaped races 13, 15 being formed on the idler 8 so long as the first and second sets of races 12, 13 and 14, 15 each comprise conjugate sets of trochoidal-like shaped races. First and second sets of cylindrical rollers are disposed at positions 20, 21 between the first and second sets of conjugate races 12, 13 and 14, 15, respectively, for rollingly transmitting torque between the races of each respective set of conjugate races. Again, it should be noted that balls could be provided between the conjugate sets of races, rather than rollers, for transmitting torque therebetween, and the present invention is equally applicable to such embodiments.

As the input shaft 2 is rotated to rotate the eccentric cam 4 about the center axis 10 of the transmission, the epitrochoidal-like shaped races 12, 14 are caused to orbit, and the first set of rollers 20 cause the epitrochoidal-like shaped races 12, 14 to rotate integrally at a first speed reduction determined by a difference in the number of lobes and recesses on the respective races 12, 13. In addition, the output hypotrochoidal-like shaped race 15 is also caused to rotate at a second speed reduction due to the roller engagement between the races 14, 15, and the output is taken from the race 15. The first and second speed reductions are caused by torque transmitted by the first and second sets of rollers 20, 21.

In conventional epicyclic speed reducing transmissions of the type described, a first radial clearance between the first set of conjugate races 12, 13 and the first set of rollers 20 is set equal to the second radial clearance between the second conjugate set of races 14, 15 and the second set of rollers 21, with a typical clearance of 4/1000 of an inch being used in the transmission. In addition, the size of the eccentric cam 4 is enlarged slightly so that the tapered roller bearings 6 urge the idler 8 radially outward in the vicinity of one or the other side of the top dead center cam position so as to reduce the above-described first and second clearances to zero at top dead center and impose a load on the first and second sets of rollers 20, 21 in the vicinity of the cam.

Since the input hypotrochoidal-like shaped race 13 comprises a stator which is fixedly supported by the housing 20 of the transmission, the race 13 tends to be relatively stiff and non-elastic as compared with the output hypotrochoidal-like shaped race 15 which is offset from and rotatably supported by tapered roller bearings 7. More specifically, support to the output race 15 tends to be more flexible and elastic than the input race 13. Therefore, the output race tends to flex or deflect more than the input race when loaded by the eccentric cam 4 since the output race is rotatably supported on an offset inner circumferential surface of the output shaft located by a relatively elastic bearing pair rather than fixedly supported by structure located around an outer circumferential surface of the output race 15. Since the flexibility and elasticity of the epitrochoidal-like shaped races 12, 14 tend to be substantially equal to one another, when the rollers 20, 21 are loaded by the eccentric cam 4, the second set of rollers 21 have a tendency to unload in the vicinity of the top dead center cam position due to the relatively large flexibility of the output race 15 as compared to the input race 13, and accordingly a substantial portion of the total load imposed by the eccentric cam 4 is carried by the first set of rollers 20. The unloading or nonloading of the second set of rollers 21 results in the rollers 21 rolling out of their optimum design positions as they rollingly transmit torque between the second set of races 14, 15 which causes the transmission to run rough and relatively inefficiently.

Figure 2:
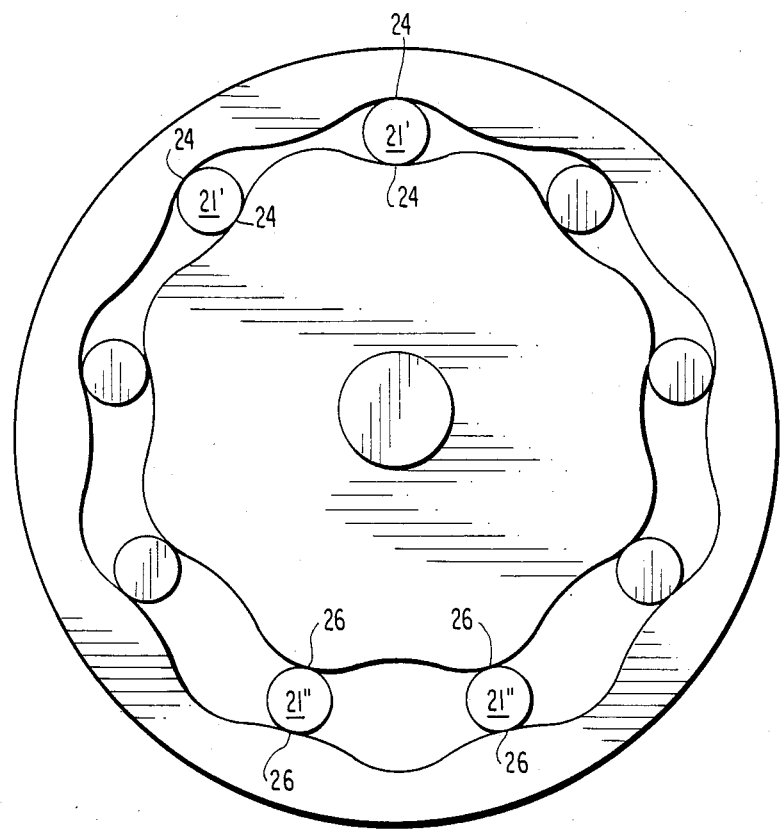
FIG. 2 illustrates a set of rollers rollingly engaged in conjugate epi- and hypo-trochoidal races.

Specifically, in operation, rollers 21' (see FIG. 2) located closest to the top dead center position of the eccentric cam 4, which in the case of FIG. 2 is at its vertical uppermost position, occupy stable positions betwen confronting recesses 24, whereas the rollers 21" located closest to a bottom dead center position of the eccentric cam 4, which is at a lowermost position in FIG. 2, are unstably entrained between confronting lobes 26. These rollers are maintained in position by retainers, with the rollers 21' tending to rotationally position the retainer since these rollers are loaded and inherently stably positioned; with the retainer, in turn, positioning the rollers 21" which inherently tend to be unstably positioned and are unloaded. However, if a sufficient load is not maintained on the rollers 21' by the eccentric cam 4, the rollers 21' are not urged into their appropriate stable positions which results in an imprecise positioning of the retainer which results in poor positioning of all the rollers since over half of them generally occupy unstable positions on or near the lobes of the confronting races. Accordingly, rough operation of the transmission results.

Furthermore, since the flexing of the output race 15 operates to unload the rollers 21', the first set of rollers 20 necessarily handle a disproportionate share of the total load imposed by the eccentric cam 4 which unduly stresses the first set of rollers 20 and the first set of conjugate races 12, 13.

Accordingly, to solve the above described drawbacks of the conventional epicyclic speed reducing transmission, according to the teachings of the present invention, the size of the first set of rollers 20 as well as the size of the first set of conjugate races 12, 13, which set includes the stator race 13, are selected such that the radial clearance between the rollers 20 and the races 12, 13 exceeds the radial clearance between the second set of rollers 21 and the second set of conjugate races including the output race 15. Typically, the radial clearance between the second set of rollers 21 and the second set of conjugate recess 14, 15 is no greater than 6/1000 of an inch, and preferably no greater than 4/1000 of an inch, with the radial clearance between the first set of rollers 20 and the first set of conjugate races 12, 13 exceeding the clearance between the second set of races and second set of rollers by no more than 2/1000 of an inch. The exact amount of clearance differential is determined such that the first and second sets of rollers 20, 21 handle equal loads when loaded by the eccentric cam 4 in operation so as to ensure that all of the rollers 20, 21 are positioned as desired so as to allow the transmission to run smoothly and efficiently.

According to the one embodiment of the invention, a deviation from the theoretical trochoidal profiles of all the races 12–15, in the direction of increasing radial clearance, is made equal for both the first and second sets of conjugate races so that no difference in the radial clearance between the rollers and the races is contributed to by the profile of the conjugate races. The rollers 20 are then formed with a greater decrease from the theoretical size expected for each conjugate set of races than are the rollers 21. That is, the decrease in size of rollers 20 from the theoretical diameter expected for the conjugate set of races 12, 13 is greater than the decrease in size of rollers 21 from the theoretical diameter expected for the conjugate set of races 14, 15. The slightly small diameter rollers 20 cause the radial clearance between the rollers 20 and the races 12, 13 to exceed the radial clearance between rollers 21 and the races 14, 15 as desired.

According to an alternative embodiment, the rollers 20 and 21 are formed to have substantially equal decreases from the theoretical diameter expected for each of the conjugate sets of races 12, 13 and 14, 15. The deviation from the theoretical trochoidal profiles 12, 13 and 14, 15, in the direction of increasing the radial clearance, is made slightly larger for the first set of conjugate races, 12, 13 than for the second set of conjugate races 14, 15 so that a desired larger radial clearance is formed between rollers 20 and the races 12, 13 than between the rollers 21 and the races 14, 15.

As indicated, according to all embodiments, the races 12–15 and the rollers 20 and 21 are sized and formed such that the difference between the radial clearance between the rollers 20 and the races 12, 13 and the radial clearance between the rollers 21 and the races 14, 15 is such that the load handled by the rollers 20 equals the load handled by the rollers 21 when the idler 8 is loaded by the eccentric cam 4, in operation.

It can readily be appreciated that various additional modifications could be made to the transmission illustrated in FIG. 1 to achieve the above-described objects without departing from the scope and spirit of the present invention, and such modifications are intended to be included in the appended claims.

I claim:

1. An epicyclic speed reducing transmission, comprising:
   an input (2);
   first and second sets of conjugate races (12-15), said first set of races including a stator race (13);
   means (4) connected to said input for orbiting one of said races (12, 14) of each of said first and second sets of conjugate races;
   a first set of rolling elements (20), transmitting torque betwen races (12, 13) of said first set of conjugate races as said one race of said first set of conjugate races is orbited;
   a second set of rolling elements (21) transmitting torque between races (14, 15) of said second set of conjugate races as said one race of said second set of conjugate races is orbited, said orbiting means loading said first and second sets of rolling elements; and
   said first set of rolling elements and said first set of conjugate races being sized so as to form a radial radial clearance therebetween, said second set of rolling elements and said second set of conjugate races being sized so as to form a second radial clearance therebetween, said first radial clearance exceeding said second radial clearance to compensate for deflection of at least one of said races of said second set when loaded by said orbiting means.

2. The transmission as claimed in claim 1, wherein said races are each formed with gear surfaces having a substantially trochoidal profile, and wherein a deviation from theoretical trochoidal profiles of all of said races, in the direction of increasing radial clearance, is made substantially equal, and wherein a diameter of the first set of rolling elements more greatly decreases from a theoretical diameter thereof than does a diameter of the second set of rolling elements.

3. The transmission as claimed in claim 2, wherein said first and second sets of rolling elements comprise first and second sets of cylindrical rollers.

4. The transmission as claimed in claim 1, wherein said races are each formed with gear surfaces having a substantially trochoidal profile, and wherein said first and second sets of rolling elements have diameters substantially equally decreased from theoretical diameters expected for each, and wherein a deviation from a theoretical trochoidal profiles, in the direction of increasing radial clearance, for the first set of conjugate races is greater than the deviation from the theoretical trochoidal profile, in the direction of increasing radial clearance, of the second conjugate set of races.

5. The transmission as claimed in claim 4, wherein said first and second set of rolling elements comprise first and second sets of cylindrical rollers.

6. An epicyclic speed reducing transmission, comprising:
   first and second sets of conjugate races (12-15);
   a first set of rolling elements (20), transmitting torque between races (12, 13) of said first set of conjugate races;
   a second set of rolling elements (21) transmitting torque between races (14, 15) of said second set of conjugate races;
   said first set of rolling elements and said first set of conjugate races being sized so as to form a radial clearance therebetween, said second set of rolling elements and said second set of conjugate races being sized so as to form a second radial clearance therebetween, and said first radial clearance exceeding said second radial clearance by an amount sufficient to cause the radial loads handled by said respective sets of rolling elements to be substantially equalized.

* * * * *